(12) United States Patent
Oveyssi

(10) Patent No.: US 6,898,052 B1
(45) Date of Patent: May 24, 2005

(54) SPINDLE MOTOR INCLUDING MAGNETIC ELEMENT FOR PRE-LOADING A BALL BEARING SET

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/741,863

(22) Filed: Dec. 19, 2003

Related U.S. Application Data

(62) Division of application No. 10/209,722, filed on Jul. 31, 2002, now abandoned.

(51) Int. Cl.[7] ............................................... G11B 17/02
(52) U.S. Cl. ..................... 360/99.08; 310/67 R; 310/90
(58) Field of Search .......................... 360/98.07, 99.04, 360/99.08; 310/90.5, 90, 67 R

(56) References Cited

U.S. PATENT DOCUMENTS

| | | | |
|---|---|---|---|
| 5,561,335 A | | 10/1996 | Dunfield et al. |
| 5,587,617 A | | 12/1996 | Dunfield et al. |
| 5,598,048 A | | 1/1997 | Dunfield et al. |
| 5,675,201 A | | 10/1997 | Komura et al. |
| 5,683,183 A | * | 11/1997 | Tanaka et al. ............... 384/100 |
| 5,686,772 A | | 11/1997 | Delamare et al. |
| 5,783,886 A | | 7/1998 | Hong |
| 6,031,651 A | | 2/2000 | Nakasugi |
| 6,081,057 A | * | 6/2000 | Tanaka et al. ................ 310/90 |
| 6,175,174 B1 | | 1/2001 | Takahaski |
| 6,208,050 B1 | | 3/2001 | Fujii et al. |
| 6,215,219 B1 | | 4/2001 | Hwang |
| 6,229,676 B1 | | 5/2001 | Prater |
| 6,307,295 B1 | | 10/2001 | Murabe et al. |
| 6,420,810 B1 | | 7/2002 | Jeong |

FOREIGN PATENT DOCUMENTS

| | | | | |
|---|---|---|---|---|
| JP | 64079413 A | * | 3/1989 | ........... G11B/19/20 |
| JP | 06311702 A | * | 11/1994 | ........... G11B/19/20 |
| JP | 09303386 A | * | 11/1997 | ........... F16C/25/08 |

* cited by examiner

*Primary Examiner*—Craig A. Renner
(74) *Attorney, Agent, or Firm*—Won Tae C. Kim, Esq.

(57) ABSTRACT

A spindle motor for use in a disk drive includes a spindle motor base and a motor shaft. The motor shaft has a central axis. The spindle motor includes a spindle motor hub rotatably coupled to the spindle motor base, the spindle motor hub including a central magnetic metal portion disposed adjacent a distal end of the motor shaft. The spindle motor includes a ball bearing set disposed between and in mechanical communication with the spindle motor hub and the motor shaft for rotatably coupling the spindle motor hub to the spindle motor base. The spindle motor includes a shaft magnetic element attached to the motor shaft at the distal end adjacent the central magnetic metal portion, the shaft magnetic element being sized and configured to apply an attractive magnetic force to the central magnetic metal portion in a direction along the central axis for pre-loading the ball bearing set.

10 Claims, 4 Drawing Sheets

SPINDLE MOTOR INCLUDING MAGNETIC ELEMENT FOR PRE-LOADING A BALL BEARING SET

CROSS-REFERENCE TO RELATED APPLICATIONS

This patent application is a divisional application of and claims priority to U.S. patent application Ser. No. 10/209,722 filed on Jul. 31, 2002, now abandoned, the contents of which are incorporated herein by reference.

BACKGROUND OF THE INVENTION

1. Field of the Invention

The present invention relates generally to spindle motors for use in a disk drives, and more particularly to a spindle motor including a magnetic element for pre-loading a ball bearing set.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The spindle motor typically includes a spindle motor base, a central shaft, a rotatable hub, a stator, a magnet attached to the hub, and vertically spaced upper and lower ball bearing sets mounted upon the central shaft which facilitate rotational attachment of the hub to the spindle motor base. Each ball bearing set includes inner and outer ball bearing races which encase a plurality of ball bearings. The inner ball bearing races engage the central shaft and the outer ball bearing races engage the hub. This configuration allows for rotational movement of the outer ball bearing races relative to the inner ball bearing races for rotation of the hub. The hub further includes an outer flange which is used to support one or more of the disks. The upper and lower ball bearing sets are pre-loaded in compression to maintain the hub and the disks supported on the hub in an orthogonal configuration with respect to the central shaft. The stator includes a series of coils and is concentrically positioned about the central shaft, adjacent the hub. With this general configuration, the various coils of the stator are selectively energized to form an electromagnetic field that pulls/pushes on the magnet otherwise associated with the hub, thereby imparting a rotational motion onto the hub. Rotation of the hub results in the rotation of the attached disks.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties. As such reduced sized disk drives may have applications in hand held or mobile electronic device, the specifications may be even tighter as compared to personal computer applications. For example, those specifications related to susceptibility to damage resulting from shock.

One particular area of focus is the reduction of the height of the spindle motor. In a typical configuration, the spindle motor height may be a function of the upper and lower ball bearing set arrangement. The mere reduction of the sizing of the upper and lower ball bearing sets impacts the susceptibility to damage resulting from shock, potential use of non-standard form factor bearing sets, and difficulties in conforming to allotted space requirements for such bearings. Accordingly, there is a need in the art for an improved spindle motor ball bearing configuration in comparison to the prior art.

SUMMARY OF THE INVENTION

An aspect of the invention can be regarded as a spindle motor for use in a disk drive. The spindle motor includes a spindle motor base and a motor shaft in mechanical communication with the spindle motor base. The motor shaft has a central axis. The spindle motor further includes a spindle motor hub rotatably coupled to the spindle motor base. The spindle motor further includes a ball bearing set disposed between and in mechanical communication with the spindle motor hub and the motor shaft for rotatably coupling the spindle motor hub to the spindle motor base. The spindle motor further includes a hub magnetic element attached to the spindle motor hub disposed about the central axis. The spindle motor further includes a base magnetic element attached to the spindle motor base disposed about the central axis. The hub and base magnetic elements are sized and configured to apply a repulsive magnetic force with respect to each other in a direction along the central axis for pre-loading the ball bearing set.

According to various embodiments, the hub magnetic element may be radially off-set in relation to the base magnetic element. The hub magnetic element may define a radial distance about the central axis less than a radial distance of the base magnetic element about the central axis. The hub magnetic element may be ring shaped, and the base magnetic element may be ring shaped. The hub magnetic element may be formed of a plurality of elements. The base magnetic element may be formed of a plurality of elements. The spindle motor may further include a hub magnetic field routing element disposed between and in mechanical communication with the hub magnetic element and the spindle motor hub. The hub magnetic field routing element may be formed of a magnetic steel material. The spindle motor may further include a base magnetic field routing element disposed between and in mechanical communication with the base magnetic element and the spindle motor base. The base magnetic field routing element may be formed of a magnetic steel material.

In addition, according to another aspect of the present invention, there is provided the above spindle motor as incorporated in a disk drive having a disk drive base and the spindle motor base of the spindle motor being attached to the disk drive base.

In addition, according to another aspect of the present invention, there is provided a spindle motor for use in a disk drive. The spindle motor includes a spindle motor base. The spindle motor further includes a motor shaft in mechanical communication with the spindle motor base. The motor shaft has a central axis and a distal end. The spindle motor further includes a spindle motor hub rotatably coupled to the spindle motor base. The spindle motor hub includes a central magnetic metal portion disposed adjacent the distal end. The spindle motor further includes a ball bearing set disposed between and in mechanical communication with the spindle motor hub and the motor shaft for rotatably coupling the spindle motor hub and the spindle motor base. The spindle motor further includes a shaft magnetic element attached to the motor shaft at the distal end adjacent the central magnetic metal portion. The shaft magnetic element is sized and configured to apply an attractive magnetic force to the central magnetic metal portion in a direction along the central axis for pre-loading the ball bearing set.

According to various embodiments, the central magnetic metal portion may be formed of a magnetic steel material. The central magnetic metal portion may be formed of a magnet. The central magnetic metal portion may have a diameter greater than a diameter of the shaft magnet element about the central axis. The central magnetic metal portion may be disk shaped. The motor shaft may include a distal opening at the distal end, and the shaft magnetic element may be disposed within the distal opening. The shaft magnetic element may be cylindrical shaped. The motor shaft may be integrally formed with the spindle motor base. The ball bearing set may include an inner race, and the spindle motor may further include a magnetic path from the shaft magnetic element to the central magnetic metal portion to the inner race to the motor shaft to the shaft magnetic element.

In addition, according to another aspect of the present invention, there is provided the above spindle motor as incorporated in a disk drive having a disk drive base and the spindle motor base of the spindle motor being attached to the disk drive base.

DESCRIPTION OF THE PREFERRED EMBODIMENTS

Figure 1:
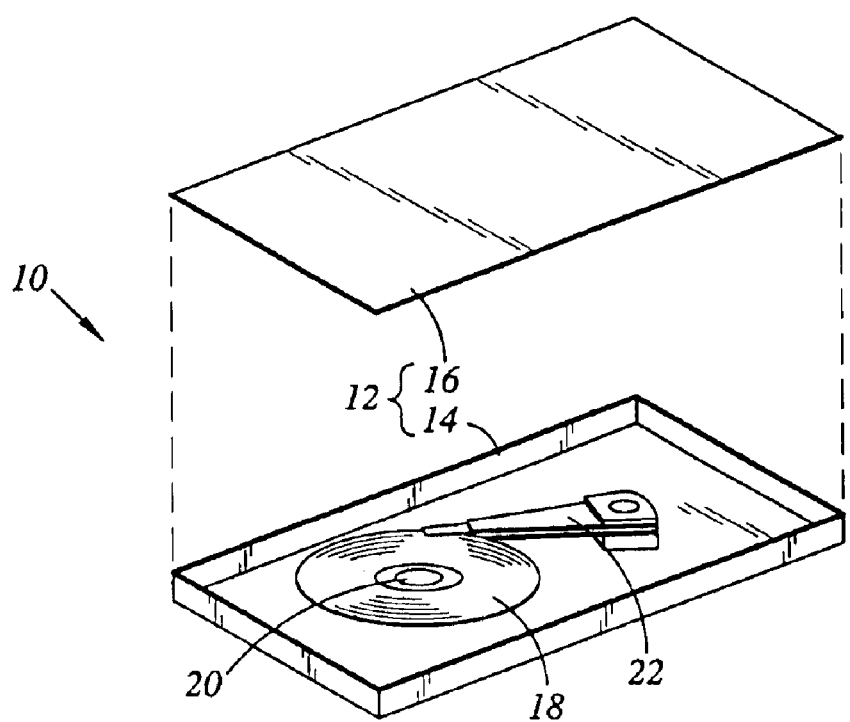
FIG. 1 is an exploded perspective view of a disk drive including a spindle motor as constructed in accordance with an aspect of the present invention.

Referring now to the drawings wherein the showings are for purposes of illustrating preferred embodiments of the present invention only, and not for purposes of limiting the same, FIGS. 1–6 illustrate a disk drive and spindle motors in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive housing 12 that may include a disk drive base 14 and a cover 16 that collectively house at least one magnetic disk 18. The disk 18 contains a plurality of tracks for storing data. The head disk assembly further includes a spindle motor 20 for rotating the disk 18 and a head stack assembly 22.

Figure 2:
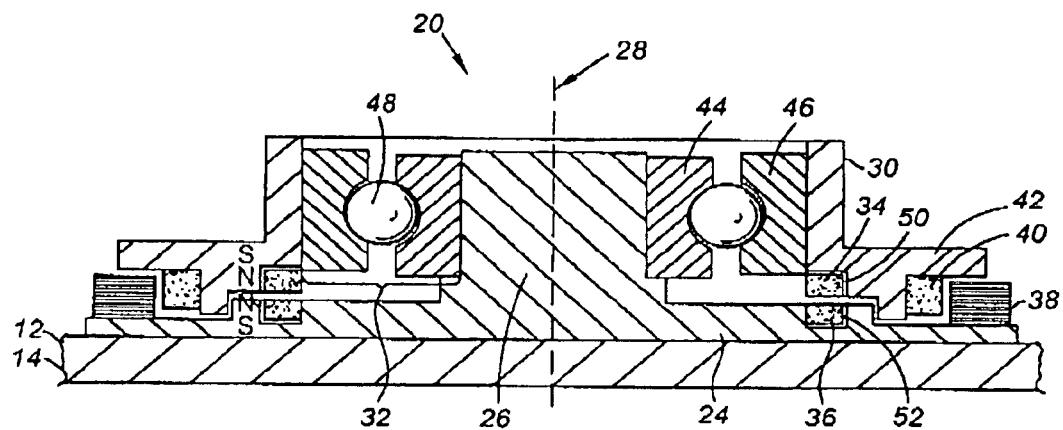
FIG. 2 is a cross sectional view of the spindle motor of FIG. 1 including a ball bearing set and hub and base magnet elements for pre-loading the ball bearing set.
Figure 3:
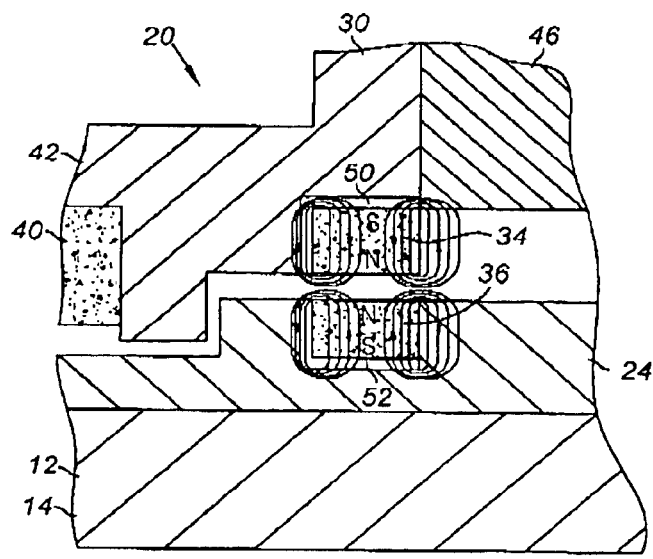
FIG. 3 is an enlarged view of a portion of the cross sectional view of the spindle motor of FIG. 2 as shown with exemplary magnetic flux lines related to the hub and base magnet elements.

Referring now to FIG. 2, there is depicted an exposed perspective view of the spindle motor 20 as constructed in accordance with an embodiment of the present invention. The spindle motor 20 includes a spindle motor base 24 and a motor shaft 26 in mechanical communication with the spindle motor base 24. The motor shaft 26 has a central axis 28. The spindle motor 20 further includes a spindle motor hub 30 rotatably coupled to the spindle motor base 24. The spindle motor 20 further includes a ball bearing set 32 disposed between and in mechanical communication with the spindle motor hub 30 and the motor shaft 26 for rotatably coupling the spindle motor hub 30 to the spindle motor base 24. The spindle motor 20 further includes a hub magnetic element 34 attached to the spindle motor hub 30 disposed about the central axis 28. The spindle motor 20 further includes a base magnetic element 36 attached to the spindle motor base 24 disposed about the central axis 28. The hub magnetic element 34 and the base magnetic element 36 is sized and configured to apply a repulsive magnetic force with respect to each other in a direction along the central axis 28 for pre-loading the ball bearing set 32. Referring additionally to FIG. 3, there is depicted an enlarged cross sectional view of a portion of the spindle motor 20 of FIG. 2 with symbolic magnetic flux lines indicated associated with the repulsive magnetic force resulting from the interaction between the hub and base magnetic elements 34, 36. It is contemplated that through the use of the hub and base magnetic elements 34, 36 the ball bearing set 32 may be pre-loaded in compression without the need for a second ball bearing set as is typically utilized in the prior art. Avoidance of use of a two axially aligned ball bearing sets arrangement advantageously allows for the single ball bearing set design of the resent invention to have a relatively thinner vertical profile.

In further detail according to an embodiment of the present invention, the spindle motor 20 is provided with a stator 38 mounted upon the spindle motor base 24 about the spindle motor hub 30. The stator 38 includes a series of coils. The spindle motor hub 30 includes a magnet 40 disposed about its periphery. The spindle motor hub 30 may further include a hub flange 42 and the magnet 40 may be seated under and against the hub flange 42. The hub flange 42 may additionally serve as support for the disk 18. The magnet 40 is positioned adjacent the stator 30. In addition, the ball bearing set 32 includes an inner race 44 and an outer race 46 which cooperatively encase a plurality of ball bearings 48. The inner race 44 is attached to the motor shaft 26, and the outer race 46 is attached to the spindle motor hub 30. With this general configuration, the various coils of the stator 38 are selectively energized to form an electromagnetic that pulls/pushes on the magnet 40 otherwise associated with the spindle motor hub 30 thereby imparting a rotational motion onto the spindle motor hub 30. Rotation of the spindle motor hub 30 results in the rotation of the attached disk 18.

According to various embodiments, the hub magnetic element 34 may be ring shaped, and the base magnetic element 36 may be ring shaped. The hub magnetic element 34 may be formed of a plurality of elements. The base magnetic element 36 may also be formed of a plurality of elements. The spindle motor 20 may further include a hub magnetic field routing element 50 disposed between and in mechanical communication with the hub magnetic element 34 and the spindle motor hub 30. The hub magnetic field routing element 50 may be formed of a magnetic steel material. It is contemplated that the hub magnetic field routing element 50 intensifies the repulsive magnetic interaction between the hub and base magnetic elements 34, 36. Similarly, the spindle motor 20 may further include a base magnetic field routing element 52 disposed between and in mechanical communication with the base magnetic element 36 and the spindle motor base 24. The base magnetic field routing element 52 may be formed of a magnetic steel material. It is contemplated that the present invention may be practiced without the use of the hub and base magnetic field routing elements 50, 52. The motor shaft 26 may be integrally formed with the spindle motor base 24 as shown. However, the motor shaft 26 may be separately formed from the spindle motor base 24 as well. In addition, it is contemplated that the spindle motor base 24 may be separately formed from the disk drive base 14 as shown or integrally formed therewith.

Figure 4:
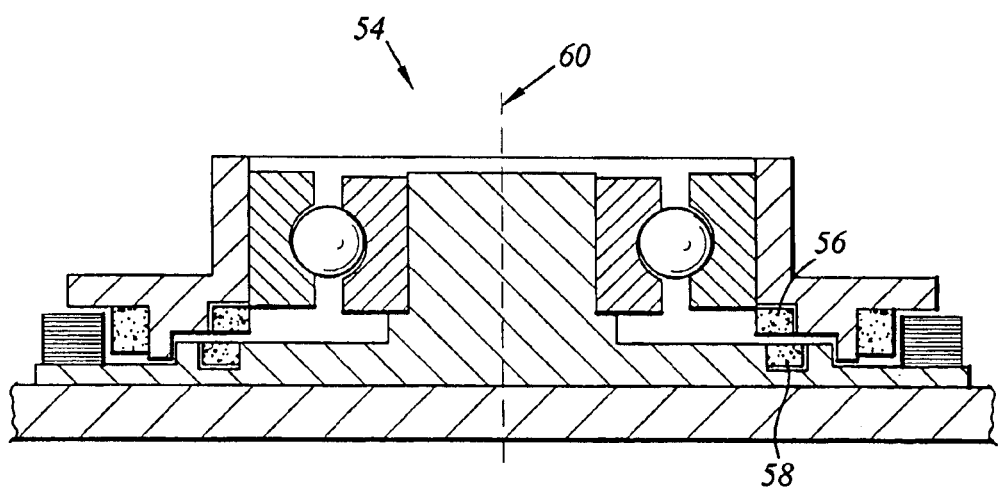
FIG. 4 is a cross sectional view similar to that of FIG. 2, however, of a spindle motor according to another aspect of the present invention including with a base magnet element having a diameter greater than a hub magnet element.

Referring now to FIG. 4, there is depicted a spindle motor 54 according to another aspect of the present invention which is similar in configuration to spindle motor 20 with the differences noted below. In this embodiment, there is provided a hub magnetic element 56 similar to the hub magnetic element 34 of the embodiment shown in FIGS. 2 and 3. Further, there is provided a base magnetic element 58 similar to the base magnetic element 36 of the embodiment shown in FIGS. 2 and 3. The hub magnetic element 56 is radially off-set in relation to the base magnetic element 58. The hub magnetic element 56 may define a radial distance about a central axis 60 less than a radial distance of the base magnetic element 58 about the central axis 60. It is contemplated that in an alternative arrangement the hub magnetic element 56 may be sized to have a greater radial distance than that of the base magnetic element 58.

Figure 5:
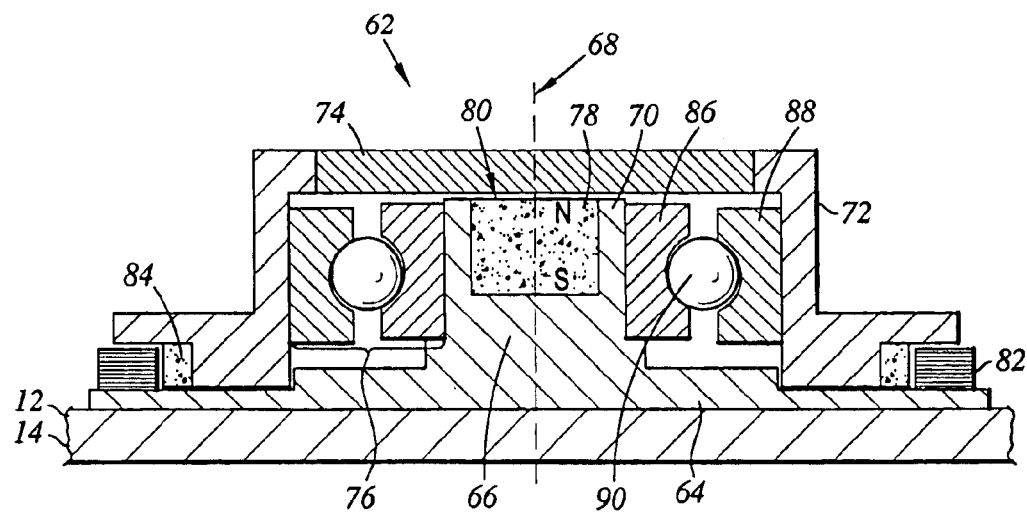
FIG. 5 is a cross sectional view similar to that of FIG. 4, however, of a spindle motor according to another embodiment with a central magnetic metal portion of a spindle motor hub and a shaft magnet element.

Referring now to FIG. 5, according to another aspect of the present invention, there is provided a spindle motor 62. The spindle motor 62 may be utilized in a disk drive, such as the disk drive 10 of FIG. 1 with the substitution of the spindle motor 62 for spindle motor 20. The spindle motor 62 includes a spindle motor base 64. The spindle motor 62 further includes a motor shaft 66 in mechanical communication with the spindle motor base 64. The motor shaft 66 has a central axis 68 and a distal end 70. The spindle motor 62 further includes a spindle motor hub 72 rotatably coupled to the spindle motor base 64. The spindle motor hub 72 includes a central magnetic metal portion 74 disposed adjacent the distal end 70. The spindle motor 62 further includes a ball bearing set 76 disposed between and in mechanical communication with the spindle motor hub 72 and the motor shaft 66 for rotatably coupling the spindle motor hub 72 and the spindle motor base 64. The spindle motor 62 further includes a shaft magnetic element 78 attached to the motor shaft 66 at the distal end 70 adjacent the central magnetic metal portion 74. The shaft magnetic element 78 is sized and configured to apply an attractive magnetic force to the central magnetic metal portion 74 in a direction along the central axis 68 for pre-loading the ball bearing set 76.

Figure 6:
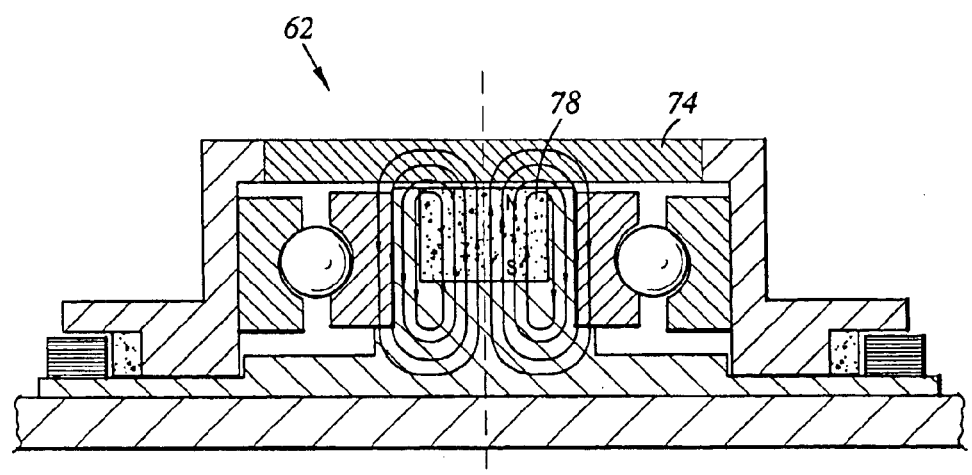
FIG. 6 is the cross sectional view of the spindle motor of FIG. 6 as shown with exemplary magnetic flux lines related to the central magnetic metal portion and the shaft magnet element.

Referring additionally to FIG. 6, there is depicted a cross sectional view of the spindle motor 62 of FIG. 5 with symbolic magnetic flux lines indicated associated with the attractive magnetic force resulting from the interaction between the shaft magnetic element 78 and the central magnetic metal portion 74. It is contemplated that through the use of the shaft magnetic element 78 and the central magnetic metal portion 74 the ball bearing set 76 may be pre-loaded in compression without the need for a second ball bearing set as is typically utilized in the prior art. Avoidance of use of a two axially aligned ball bearing sets arrangement advantageously allows for the single ball bearing set design of the resent invention to have a relatively thinner vertical profile.

According to various embodiments, the central magnetic metal portion 74 may be formed of a magnetic steel material. The central magnetic metal portion 74 may be formed of a magnet. The central magnetic metal portion 74 may have a diameter greater than a diameter of the shaft magnet element 78 about the central axis 68. The central magnetic metal portion 74 may be disk shaped. The motor shaft 66 may include a distal opening 80 at the distal end 70, and the shaft magnetic element 78 may be disposed within the distal opening 80. The shaft magnetic element 78 may be cylindrical shaped as shown. However other shapes and geometries are contemplated. The motor shaft 66 may be integrally formed with the spindle motor base 64 as shown. However, the motor shaft 66 may be separately formed from the spindle motor base 64 as well. In addition, it is contemplated that the spindle motor base 64 may be separately formed from the disk drive base 14 as shown or integrally formed therewith.

In addition, there may be provided a stator 82, a magnet 84, an inner race 86, an outer race 88 and ball bearings 90 similar in configuration to the stator 38, the magnet 40, the inner race 44, the outer race 46 and the ball bearings 48 described about in relation to the embodiment of the spindle motor 20 shown in FIGS. 2 and 3. The spindle motor 62 may further include a magnetic path from the shaft magnetic element 78 to the central magnetic metal portion 74 to the inner race 85 to the motor shaft 66 to the shaft magnetic element 78 as symbolically indicated by the flux lines in FIG. 6.

I claim:

1. A spindle motor for use in a disk drive, the spindle motor comprising:

a spindle motor base;

a motor shaft in mechanical communication with the spindle motor base, the motor shaft having a central axis and a distal end;

a spindle motor hub rotatably coupled to the spindle motor base, the spindle motor hub including a central magnetic metal portion disposed adjacent the distal end;

a ball bearing set disposed between and in mechanical communication with the spindle motor hub and the motor shaft for rotatably coupling the spindle motor hub and the spindle motor base; and a shaft magnetic element attached to the motor shaft at the distal end adjacent the central magnetic metal portion;

wherein the shaft magnetic element being sized and configured to apply an attractive magnetic force to the central magnetic metal portion in a direction along the central axis for pre-loading the ball bearing set.

2. The spindle motor of claim 1 wherein the central magnetic metal portion is formed of a magnetic steel material.

3. The spindle motor of claim 2 wherein the central magnetic metal portion is formed of a magnet.

4. The spindle motor of claim 1 wherein the central magnetic metal portion has a diameter greater than a diameter of the shaft magnet element about the central axis.

5. The spindle motor of claim 1 wherein the central magnetic metal portion is disk shaped.

6. The spindle motor of claim 1 wherein the motor shaft includes a distal opening at the distal end, the shaft magnetic element is disposed within the distal opening.

7. The spindle motor of claim 1 wherein the shaft magnetic element is cylindrical shaped.

8. The spindle motor of claim 1 wherein the motor shaft is integrally formed with the spindle motor base.

9. The spindle motor of claim 1 wherein the ball bearing set includes an inner race, the spindle motor further includes a magnetic path from the shaft magnetic element to the central magnetic metal portion to the inner race to the motor shaft to the shaft magnetic element.

10. A disk drive comprising:

a disk drive base; and a spindle motor attached to the disk drive base, the spindle motor including;

a spindle motor base attached to the disk drive base;

a motor shaft in mechanical communication with the spindle motor base, the motor shaft having a central axis and a distal end;

a spindle motor hub rotatably coupled to the spindle motor base, the spindle motor hub including a central magnetic metal portion disposed adjacent the distal end;

a ball bearing set disposed between and in mechanical communication with the spindle motor hub and the motor shaft for rotatably coupling the spindle motor hub and the spindle motor base; and a shaft magnetic element attached to the motor shaft at the distal end adjacent the central magnetic metal portion;

wherein the shaft magnetic element being sized and configured to apply an attractive magnetic force to the central magnetic metal portion in a direction along the central axis for pre-loading the ball bearing set.

* * * * *